United States Patent

Sura

[15] 3,691,133
[45] Sept. 12, 1972

[54] POLYEPOXIDE COMPOSITIONS CONTAINING DICYANDIAMIDE AND AN IODONIUM, PHOSPHONIUM, OR SULFONIUM SALT

[72] Inventor: James J. Sura, Warren Township, N.J.

[73] Assignee: Union Carbon Corporation

[22] Filed: March 25, 1971

[21] Appl. No.: 128,133

[52] U.S. Cl.........260/47 EC, 117/127, 117/138.8 R, 117/148, 252/182, 260/2 EC, 260/37 EP, 260/59, 269/78.4 EP
[51] Int. Cl. ............................................C08g 30/14
[58] Field of Search.......260/47 EC, 2 EC, 18 EP, 59

[56] References Cited

UNITED STATES PATENTS 2,928,811   3/1960   Belanger......................260/47
3,377,406   4/1968   Newey et al. ...............260/837
3,547,885   12/1970  Dante et al. .................260/47

Primary Examiner—William H. Short
Assistant Examiner—T. E. Pertilla
Attorney—Paul A. Rose, Aldo J. Cozzi and James C. Arvantes

[57] ABSTRACT

The disclosure of this application is directed to polyepoxide compositions, containing dicyandiamide and an iodonium, phosphonium or sulfonium salt, which are relatively stable at room temperature and can be cured at moderately elevated temperatures in a relatively short period of time to thermoset products characterized by excellent thermal stability, and when used in adhesive applications to bond together materials such as wood, plastic and metal, by excellent bonding strength.

13 Claims, No Drawings

POLYEPOXIDE COMPOSITIONS CONTAINING DICYANDIAMIDE AND AN IODONIUM, PHOSPHONIUM, OR SULFONIUM SALT

This invention relates to curable, polyepoxide compositions. More particularly, this invention relates to curable, polyepoxide compositions, containing dicyandiamide and an iodonium, phosphonium or sulfonium salt, which are relatively stable at room temperature and can be cured in a relatively short period of time by heating at moderately elevated temperatures, to thermoset products characterized by excellent thermal stability, and when used as adhesives to bond together materials such as wood, plastic, metal and the like, by excellent bonding strength.

Polyepoxide compositions are cured to thermoset products by admixing a curing agent therewith with the result that a reaction occurs between the reactive components of the composition and the composition cures to a thermoset product. This has presented a serious practical problem of utilizing these compositions inasmuch as polyepoxide compositions, containing conventional curing agents such as tetraethylenetriamine usually cure to thermoset products, even at ambient temperatures, in a relatively short period of time.

It has been suggested, therefore, that latent-acting curing agents, such as dicyandiamide be employed with the polyepoxides to obtain compositions which are relatively stable at room temperature and consequently have relatively long storage or shelf life.

The use of dicyandiamide as a latent-acting curing agent for polyepoxide compositions has not proved to be particularly effective, however, especially when the resultant polyepoxide compositions are to be used as adhesives. It has been found necessary to heat these compositions to relatively high temperatures in order to effect a cure thereof. High temperature curing is highly undesirable as it excludes the use of these compositions as adhesives in the bonding of heat-sensitive materials.

The present invention provides polyepoxide compositions which are relatively stable at room temperature, that is have relatively long storage or shelf life and which can be cured at moderately elevated temperatures, in a relatively short period of time, to thermoset products which are characterized by excellent thermal stability and when used as adhesives to bond together wood, metal, plastics and other like material, by excellent bonding strength.

The compositions of this invention comprise a polyepoxide, dicyandiamide and an iodonium, phosphonium or sulfonium salt wherein: the dicyandiamide is present in an amount sufficient to cure the polyepoxide to a thermoset product, generally in an amount of about 70 percent of stoichiometric to about 25 percent in excess of stoichiometric; and the iodonium, phosphonium or sulfonium salt is present in an amount of about 5 to about 50 percent by weight, preferably about 5 to about 40 percent by weight, based on the weight of the dicyandiamide.

For purposes of stoichiometric calculations with respect to the dicyandiamide, one hydrogen atom is deemed to react with one epoxy oxygen atom.

Illustrative of suitable polyepoxides for purposes of this invention are those organic compounds having an epoxy equivalency of greater than one, that is, compounds having an average of more than one epoxy group, i.e., oxirane epoxy group, per molecule. These compounds wherein the oxygen of the epoxy group is attached to vicinal carbon atoms can be saturated or unsaturated, aliphatic, cycloaliphatic, or heterocyclic, and can be substituted, with substituents such as halogen atoms, hydroxyl groups, ether groups, and the like.

Among suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al, U. S. Pat. No. 2,506,486, and polyphenylols such as the novolak condensation product of a phenol and a saturated or unsaturated aldehyde containing an average of from 3 to 20 or more phenylol groups per molecule (cf. "Phenoplasts" by T. S. Carswell, published in 1947 by Interscience Publishers, New York). Exemplary of suitable polyphenylols derived from a phenol and an unsaturated aldehyde such as acrolein are the triphenylols, pentaphenylols, and heptaphenylols described in U. S. Pat. No. 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U. S. Pat. No. 2,506,486). The polyhydric polynuclear phenols can consist of two or more phenols connected by such groups as methylene, alkylene, or sulfone. The connecting groups are further exemplified by bis(p-hydroxyphenyl)methane, bis(p-hydroxyphenyl)dimethylmethane, and dihydroxydiphenylsulfone.

Process for the preparation of polyglycidyl ethers of polyhydric phenols is described in detail in the Bender et al. patent, supra, and U. S. Pat. No. 2,801,989 to A. G. Farnham.

Among the more common polyglycidyl ethers of polyhydric phenols are polyglycidyl ether of 2,2-bis(p-hydroxyphenyl)-propane and polyglycidyl ether of bis(p-hydroxyphenyl)methane. Other suitable polyglycidyl ethers of polyhydric phenols are enumerated in U. S. Pat. No. 2,633,458.

Also suitable are the polyglycidyl ethers of polyhydric alcohols, such as the reaction products of epichlorohydrin and polyhydric alcohols for example, aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U. S. Pat. No. 2,898,349 to P. Zuppinger et al.)

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U. S. Pat. No. 2,870,170 to Payne et al. Also suitable are polyglycidyl compounds produced by reacting epichlorohydrin with aromatic amines, such as aniline, 2,6-dimethylaniline, p-toluidine, m-chloraniline, p-aminodiphenyl, m-phenylenediamine, p-phenylenediamine, 4,4'-diaminodiphenylmethane, or with amino phenols such as p-aminophenol, 5-amino-1-naphthol, 4-aminoresorcinol, 2-methyl-4-aminophenol, 2-chloro-4-aminophenol, and the like. Specific compounds include, among others, N,N-diglycidyl aniline, N,N-diglycidyl-2,6-dimethyl aniline, N,N,N',N'-tetraglycidyl-4,4'-diaminodiphenylmethane, the triglycidyl derivative of p-aminophenol wherein the amino hydrogen and OH hydrogen atoms are replaced by glycidyl groups. Polyglycidyl derivatives of aromatic amines and amino phenols and methods for their preparation are further described in U. S. Pat. No. 2,951,882 to N. H. Reinking and in U. S. Pat. No. 2,951,825 to N. H. Reinking et al. The so-called peracetic acid epoxies which are obtained by epoxidation across a double bond using peracetic acid, such as bis-(2,3-epoxycyclopentyl)ether and the like are also suitable.

It is to be understood that the disclosure of all patents and literature references referred to in this specification are incorporated herein by reference.

Exemplary of phosphonium salts, used in the present invention are the phosphonium halides having the formula:

Formula I

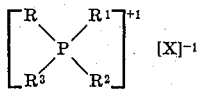

wherein X is a halogen atom, chlorine, bromine, iodine or fluorine and each R–R$^3$, which can be the same or different, are hydrocarbon radicals, including hydrocarbon radicals substituted with one or more functional groups such as halogens, hydroxy and the like. Generally the hydrocarbon radicals have a maximum of 18 carbon atoms and preferably a maximum of 10 carbon atoms.

Among suitable phosphonium halides are the following: methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tri-n-butyl phosphonium iodide, ethyl tri-n-butyl phosphonium iodide, propyl tri-n-butyl phosphonium iodide, methyl triphenyl phosphonium chloride, ethyl triphenyl phosphonium chloride, isopropyl-tri-n-butyl phosphonium chloride, n-butyl triphenyl phosphonium chloride, ethyl triphenyl phosphonium bromide, ethyl triphenyl phosphonium fluoride and the like.

Suitable sulfonium salts, used in the present invention, include among others the sulfonium halides having the formula:

Formula II

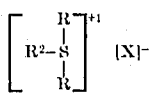

wherein R–R$^2$ and X are as defined in Formula I.

Specific sulfonium halides falling within the scope of Formula II are: trimethyl sulfonium iodide, triethyl sulfonium iodide, methyl diethyl sulfonium iodide, ethyl-di-n-propyl sulfonium iodide, tri-β-hydroxyethyl sulfonium chloride, triphenyl sulfonium iodide and the like.

Iodonium salts, suitable for purposes of this invention are the iodonium halides having the formula:

Formula III

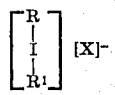

Wherein R, R$^1$ and X are as defined in Formula I.

Suitable sulfonium halides falling within the scope of Formula III are: diphenyl iodonium iodide, diphenyl iodonium chloride and the like.

Other suitable salts are described in U.S. Pat. Nos. 3,477,990 and 3,412,046.

It is to be noted that mixtures of iodonium, phosphonium and sulfonium salts can be used if so desired.

The compositions of this invention are prepared by admixing the polyepoxide, dicyandiamide and the "-salts" together at room temperature in any suitable vessel or if desired, on a three roll mill.

Curing of these compositions can be effected at moderately elevated temperatures generally on the order of about 250° F. to about 350° F. and preferably about 275° F. to about 300° F.

Additional materials such as fillers, pigments, fibers, dyes, plasticizers and the like can be added to the compositions of the present invention, if so desired.

In the following examples, which are illustrative of the present invention, the compositions were formulated on a three roll mill and used as adhesives to bond together, in each case, two aluminum panels by coating one of the panels to a thickness of 2 mils and then pressing the two aluminum panels together. The panels were then subjected to heat and pressure. The bonding strength of each composition was determined by the Lap Shear Strength test. (ASTMD–1002–64)

The curing cycles used are set forth in the tables below. Also set forth in the tables below, along with the result of the Lap Shear Strength test are the formulations of the compositions wherein amounts noted are in parts by weight.

TABLE I

| | Examples | | | | | | Controls | |
|---|---|---|---|---|---|---|---|---|
| | 1 | 2 | 3 | 4 | 5 | 6 | 1 | 2 |
| Triglycidyl derivative of p-aminophenol | 100 | 100 | 100 | 100 | 100 | 100 | 100 | 100 |
| Asbestos | 30 | 30 | 30 | 30 | 30 | 30 | 30 | 30 |
| Dicyandiamide | 18.6 | 18.6 | 18.6 | 18.6 | 18.6 | 18.6 | 18.6 | 18.6 |
| Ethyl triphenyl phosphonium iodide | 2.5 | 4.0 | | | | | | |
| Diphenyl iodonium iodide | | | 2.5 | 4.0 | | | | |
| Trimethyl sulfonium iodide | | | | | 2.5 | 4.0 | | |
| Tetramethyl ammonium iodide | | | | | | | 2.5 | 4.0 |
| Lap shear strength, cured hour at 250° F. under a pressure of 100 p.s.i., tested at: | | | | | | | | |
| 73° F | 1,848 | 1,454 | 2,992 | 1,992 | 2,238 | 1,960 | 2,166 | 2,646 |
| 180° F | 2,324 | 2,206 | 2,156 | 2,014 | 2,194 | 2,154 | 0 | 80 |
| 250° F | 3,006 | 2,860 | 1,494 | 1,634 | 2,936 | 3,054 | 0 | 0 |
| Lap shear strength, cured 20 minutes at 300° F. under a pressure of 100 p.s.i., tested at: | | | | | | | | |
| 73° F | 2,276 | 1,996 | 2,354 | 2,016 | 2,374 | 2,530 | 724 | 556 |
| 180° F | 2,010 | 2,334 | 2,174 | 1,974 | 2,576 | 2,310 | 0 | 0 |
| 250° F | 2,684 | 2,761 | 1,940 | 2,316 | 2,684 | 2,720 | 0 | 0 |

TABLE II

| | Examples | | | | | |
| --- | --- | --- | --- | --- | --- | --- |
| | 7 | 8 | 9 | 10 | 11 | Control 3 |
| Diglycidylether of 2,2-bis-(p-hydroxyphenyl)propane | 100 | 100 | 100 | 100 | 100 | 100 |
| Asbestos | 30 | 30 | 30 | 30 | 30 | 30 |
| Dicyandiamide | 10 | 10 | 10 | 10 | 10 | 10 |
| Ethyl triphenyl phosphonium iodide | 2.5 | 4.0 | | | | |
| Diphenyl iodonium iodide | | | 2.5 | 4.0 | | |
| Trimethyl sulfonium iodide | | | | | 2.5 | |
| Lap shear strength, cured 30 minutes at 275° F. under a pressure of 100 p.s.i., tested at: 73° F | 2,784 | 3,132 | 1,700 | 2,410 | 2,232 | 0 |

NOTE.—The diglycidylether had an epoxy equivalent weight of 190.

Tests were also conducted as to the stability of the compositions. Compositions tested and the results thereof are noted below.

| Compositions | Gel Time |
| --- | --- |
| Example 1 | did not gel after 4 months at ambient temperatures |
| Example 2 | ↓ |
| Example 3 | |
| Example 4 | |
| Example 5 | |
| Example 6 | ↓ |
| Control 1 | gelled after one month at ambient temperatures |
| Control 4 | ↓ |

Control 4 was the same as Control 1 with the exception that tetramethyl ammonium chloride was used in lieu of the tetramethyl ammonium iodide.

What is claimed is

1. A curable composition consisting essentially of a polyepoxide having an epoxy equivalency of more than one wherein the oxygen of each epoxy group is attached to vicinal carbon atoms, dicyandiamide in an amount sufficient to cure said composition to a thermoset product and a phosphonium or sulfonium salt in an amount of about 5 to about 50 percent by weight, based on the weight of the dicyandiamide.

2. A curable composition as defined in claim 1 wherein the dicyandiamide is present in an amount of about 70 percent of stoichiometric to about 25 percent in excess of stoichiometric.

3. A curable composition as defined in claim 1 wherein the said salt is present in an amount of about 5 to about 40 percent by weight, based on the weight of the dicyandiamide.

4. A curable composition as defined in claim 1 wherein the polyepoxide is a polyglycidylether of a polyhydric phenol.

5. A curable composition as defined in claim 1 wherein the polyepoxide is the diglycidylether of 2,2-bis-(p-hydroxyphenyl)propane.

6. A curable composition as defined in claim 1 wherein the said salt has the formula:

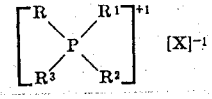

wherein X is a halogen atom, and R-R³ are monovalent hydrocarbon radicals containing a maximum of 18 carbon atoms.

7. A curable composition as defined in claim 1 wherein the said salt has the formula:

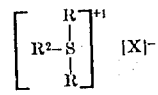

wherein R-R² and X are as defined in claim 6.

8. A curable composition as defined in claim 1 wherein the said salt is trimethyl sulfonium iodide.

9. A curable composition as defined in claim 1 wherein the said salt is ethyl triphenyl phosphonium iodide.

10. A curable composition as defined in claim 8 wherein the polyepoxide is diglycidylether of 2,2-bis-(p-hydroxy-phenyl)propane.

11. A curable composition as defined in claim 9 wherein the polyepoxide is diglycidyl ether of 2,2-bis-(p-hydroxyphenyl)propane.

12. A curable composition as defined in claim 1 wherein the polyepoxide is triglycidyl ether of p-aminophenol.

13. The cured product of the composition defined in claim 2.

* * * * *